US012246918B2

(12) United States Patent
York et al.

(10) Patent No.: US 12,246,918 B2
(45) Date of Patent: *Mar. 11, 2025

(54) MATERIAL HANDLING APPARATUS WITH VEHICLE TRACK FOR REDUCING VEHICLE DAMAGE

(71) Applicant: OPEX Corporation, Moorestown, NJ (US)

(72) Inventors: Michael York, Moorestown, NJ (US); Joseph Lakawicz, Moorestown, NJ (US); Stuart Ligo, Moorestown, NJ (US)

(73) Assignee: OPEX Corporation, Moorestown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,644

(22) Filed: Oct. 2, 2023

(65) Prior Publication Data

US 2024/0124229 A1    Apr. 18, 2024

Related U.S. Application Data

(63) Continuation of application No. 17/864,737, filed on Jul. 14, 2022, now Pat. No. 11,807,456, which is a continuation of application No. 17/672,275, filed on Feb. 15, 2022, now Pat. No. 11,453,553.

(60) Provisional application No. 63/150,909, filed on Feb. 18, 2021.

(51) Int. Cl.
*B65G 1/04* (2006.01)
*B07C 3/08* (2006.01)
*B07C 5/36* (2006.01)
*B65G 1/06* (2006.01)
*B65G 1/137* (2006.01)

(52) U.S. Cl.
CPC ............ *B65G 1/0492* (2013.01); *B07C 3/082* (2013.01); *B07C 5/36* (2013.01); *B65G 1/065* (2013.01); *B65G 1/1373* (2013.01)

(58) Field of Classification Search
CPC .... B65G 1/0492; B65G 1/1373; B65G 1/065; B07C 3/082; B07C 5/36; B07C 3/04
See application file for complete search history.

(56) References Cited

U.S. PATENT DOCUMENTS

| | | | | |
|---|---|---|---|---|
| 4,895,242 A | * | 1/1990 | Michel | B65G 47/965 198/704 |
| 6,762,382 B1 | * | 7/2004 | Danelski | B65G 17/002 209/912 |
| 7,861,844 B2 | | 1/2011 | Hayduchok et al. | |

(Continued)

OTHER PUBLICATIONS

Search Report issued in WIPO for Application PCT/2022/16466 on Jun. 2, 2022.

*Primary Examiner* — Thomas Randazzo
(74) *Attorney, Agent, or Firm* — Brian Dinicola

(57) ABSTRACT

A method and apparatus are provided for delivering items to a plurality of storage locations is provided. The system includes a plurality of storage locations. The storage locations may be positioned to provide an aisle and a plurality of delivery vehicles may be operable within the aisle to deliver items to the storage locations. The system may include a track that the guides the vehicles to the storage locations. A reorientation assembly may be provided for re-orienting the vehicles relative to the track to reduce misalignment between the vehicles and the track.

12 Claims, 13 Drawing Sheets

(56) References Cited

U.S. PATENT DOCUMENTS

| | | | |
|---|---|---|---|
| 8,104,601 B2 | 1/2012 | Hayduchok et al. | |
| 8,276,740 B2 | 10/2012 | DeWitt et al. | |
| 8,622,194 B2* | 1/2014 | DeWitt | B07C 3/087 |
| | | | 198/347.1 |
| 9,010,517 B2 | 4/2015 | Hayduchok et al. | |
| 9,122,566 B2 | 9/2015 | Bastian, II et al. | |
| 9,687,883 B2* | 6/2017 | Hayduchok | B07C 7/02 |
| 10,052,661 B2 | 8/2018 | Hayduchok et al. | |
| 10,494,192 B2 | 12/2019 | DeWitt et al. | |
| 10,576,505 B2 | 3/2020 | Hayduchok et al. | |
| 10,639,678 B2 | 5/2020 | Cherry et al. | |
| 10,766,712 B2 | 9/2020 | DeWitt et al. | |
| 10,865,053 B2 | 12/2020 | DeWitt et al. | |
| 11,014,744 B2 | 5/2021 | Muttathil et al. | |
| 11,192,144 B2 | 12/2021 | Hayduchok et al. | |
| 11,453,553 B2* | 9/2022 | York | B65G 1/0414 |
| 2014/0257555 A1* | 9/2014 | Bastian, II | B65G 1/0492 |
| | | | 104/287 |
| 2017/0267452 A1* | 9/2017 | Goren | B65G 1/0492 |
| 2017/0320102 A1* | 11/2017 | McVaugh | B65G 1/0492 |
| 2018/0148259 A1* | 5/2018 | Gravelle | B65G 1/04 |
| 2020/0062512 A1* | 2/2020 | DeWitt | B07C 5/36 |
| 2020/0122923 A1* | 4/2020 | Moulin | B65G 1/0435 |
| 2020/0180863 A1* | 6/2020 | Moulin | B65G 1/0492 |
| 2020/0216298 A1* | 7/2020 | Gravelle | B66F 9/122 |
| 2022/0258208 A1 | 8/2022 | York et al. | |

* cited by examiner

MATERIAL HANDLING APPARATUS WITH VEHICLE TRACK FOR REDUCING VEHICLE DAMAGE

PRIORITY CLAIM

This application is a continuation of co-pending U.S. patent application Ser. No. 17/864,737 filed on Jul. 14, 2022, which is a continuation of U.S. patent application Ser. No. 17/672,275 filed on Feb. 15, 2022, which claims priority under 35 U.S.C. § 119 to U.S. Provisional Patent Application No. 63/150,909 filed on Feb. 18, 2021. The entire disclosure of each of the foregoing applications is hereby incorporated herein by reference.

FIELD OF THE INVENTION

The present invention relates to material handling systems and, more particularly, to systems that utilize a plurality of storage locations in one or more storage racks. More particularly, the present invention relates to such material handling systems that utilize one or more automated delivery vehicles for delivering items to the storage locations.

BACKGROUND OF THE INVENTION

The use of automated storage and retrieval has significantly improved the efficiency of material handling. For instance, in the order fulfillment application, automated storage and retrieval systems have significantly reduced the time required to retrieve the items required to fulfill a customer order. A variety of automated storage and retrieval systems are currently known. One exemplary type of system utilizes one or more storage racks, a plurality of vehicles and a track for guiding the vehicles to the storage locations on the racks. The vehicles deliver items to storage locations or bins where operators may remove the items from the storage locations to fulfill orders. Over time, the vehicles may tend to jam or become damaged from interaction with the track. Accordingly, it would be desirable to provide a system having a track that minimizes wear and damage to the vehicles that travel along the track.

SUMMARY OF THE INVENTION

According to one aspect, the present invention provides a material handling apparatus that includes a plurality of sort locations for receiving items. The system may include one or more vehicles for delivering items to the sort location. The vehicles may travel along a track. The track may include a section for improving interaction between the vehicles and the track. In one embodiment, the section includes a portion that reduces engagement between driving elements on the vehicle and the track.

Optionally, the vehicle includes a drive mechanism that engages the track and the track includes a section that allows portions of the drive mechanism to disengage portions of the track.

The track may optionally include a profile configured to positively engage the drive mechanism of the vehicles.

According to a preferred embodiment, the track optionally includes teeth or recesses that engage mating elements of the drive mechanism of the vehicles.

While the methods and apparatus are described herein by way of example for several embodiments and illustrative drawings, those skilled in the art will recognize that the inventive methods and apparatus for sorting items using a dynamically reconfigurable sorting array are not limited to the embodiments or drawings described. It should be understood that the drawings and detailed description thereto are not intended to limit embodiments to the particular form disclosed. Rather, the intention is to cover all modifications, equivalents and alternatives falling within the spirit and scope of the methods and apparatus for sorting items using one or more dynamically reconfigurable sorting array defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

BRIEF DESCRIPTION OF THE DRAWINGS

The foregoing summary and the following detailed description of the preferred embodiments of the present invention will be best understood when read in conjunction with the appended drawings, in which the same reference numbers will be used throughout the drawings to refer to the same or like parts.

DETAILED DESCRIPTION OF THE INVENTION

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
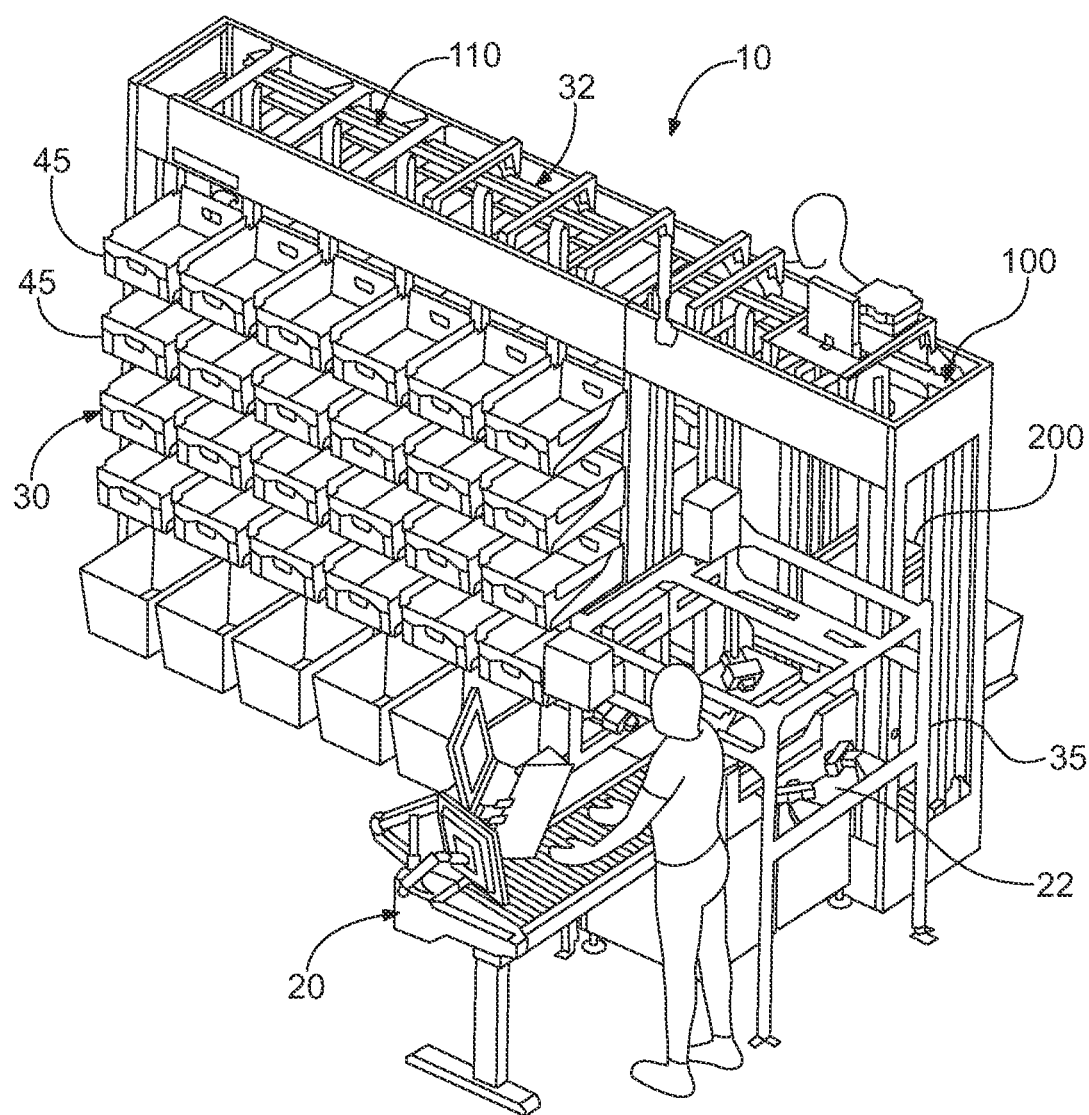
FIG. 1 is a perspective view of a material handling apparatus incorporating aspects of the present invention.
Figure 2:
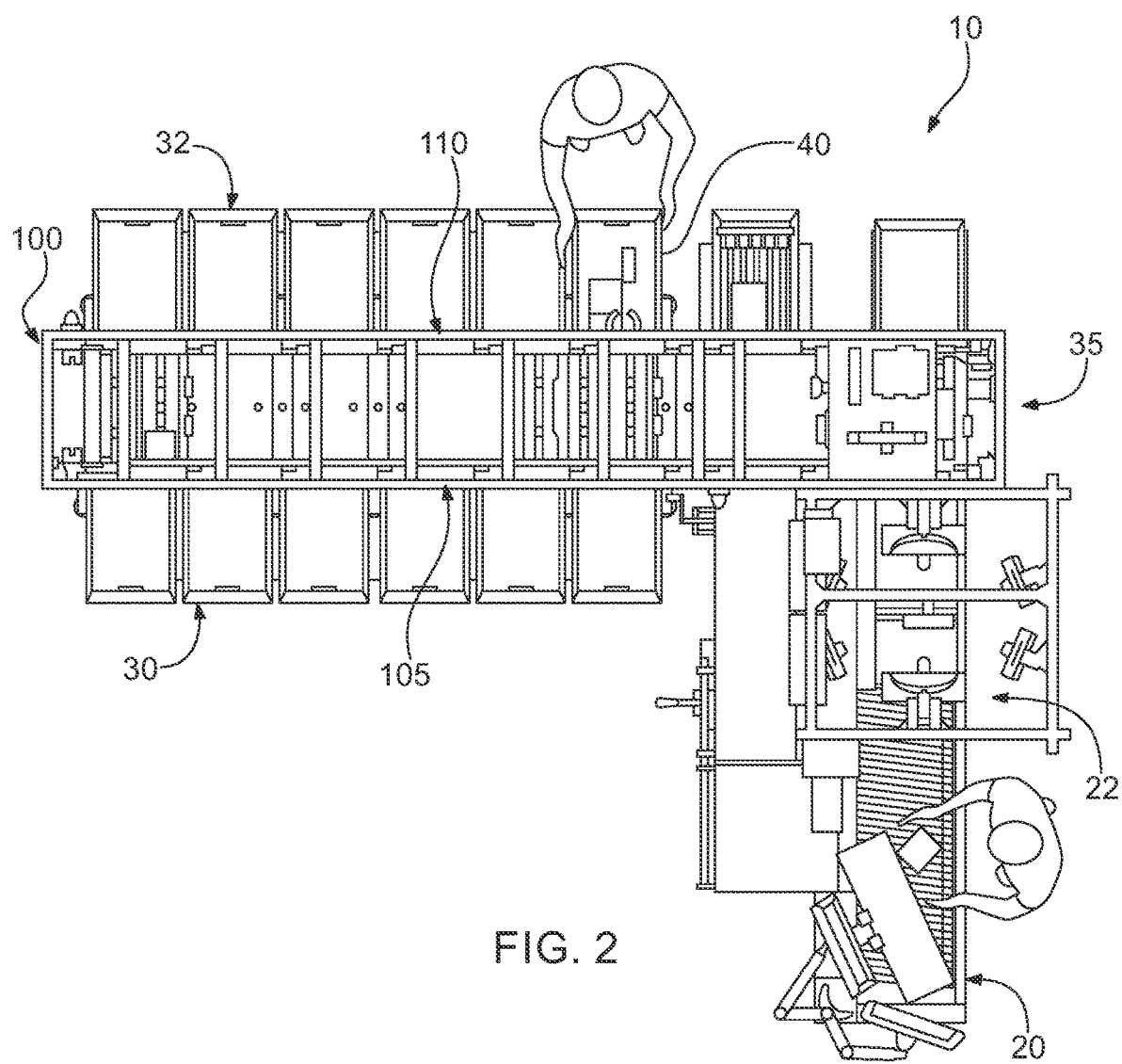
FIG. 2 is a plan view of the material handling apparatus illustrated in FIG. 1.
Figure 3:
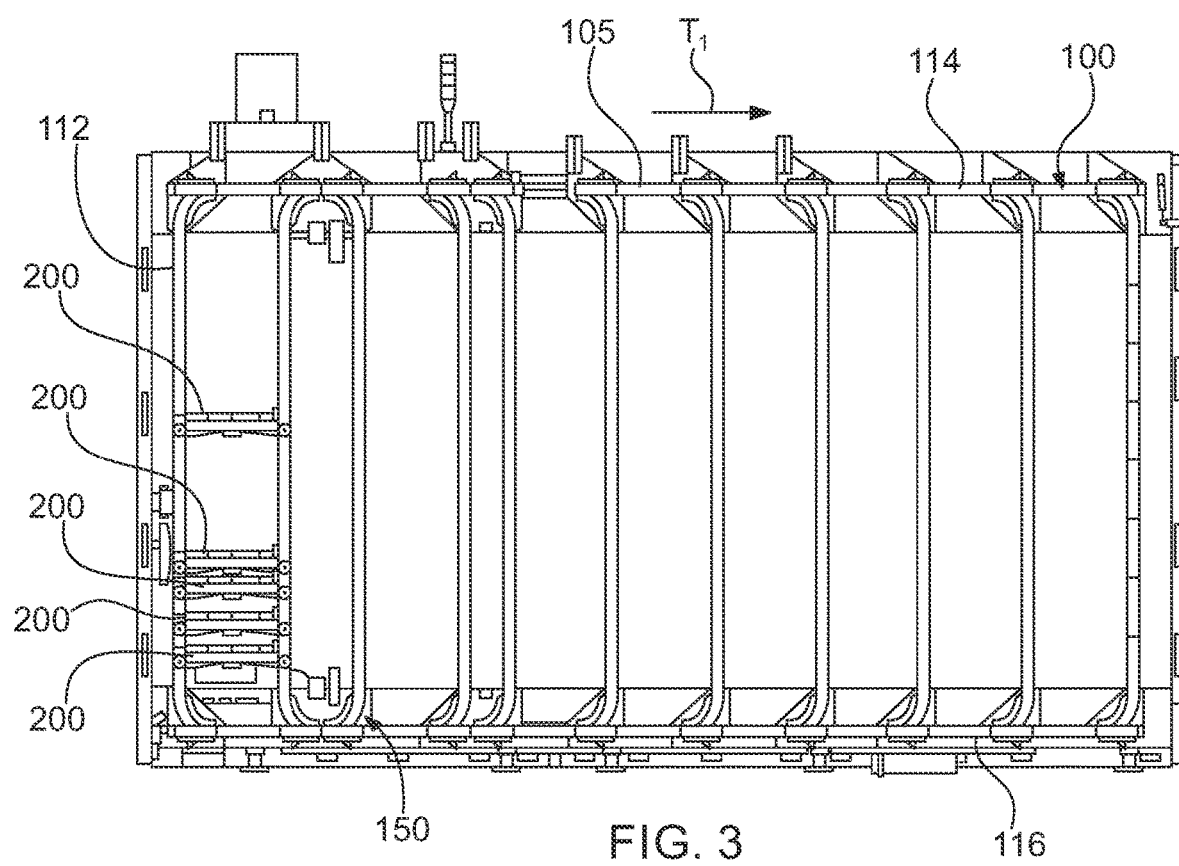
FIG. 3 is schematic side view of a track system of the material handling apparatus illustrated in FIG. 1.

Referring now to FIGS. 1-6 generally and to FIGS. 1-2 specifically, a material handling apparatus is designated 10. The system 10 may take any number of forms that incorporate a plurality of storage locations. In the present instance, the system includes a pair of spaced apart storage racks 30, 32 with an aisle 35 formed between the storage racks. A plurality of automated delivery vehicles 200 may operate within the aisle 35. In particular, the delivery vehicles 200 may travel along a track 100 that is positioned in the aisle, as described further below. Additionally, as shown in FIGS. 7-16 and described in greater detail below, the system 10 may include one or more mechanisms for improving the engagement between the track and the vehicles. For instance, the track may optionally include a section for re-orienting the vehicle relative to the track.

In an exemplary system illustrated in FIGS. 1-2, the material handling apparatus includes an optional station for feeding items into the system. This station is referred to as the induction station 20. The induction station 20 may determine an identifying characteristic for the items to be fed into the system. The identifying characteristic can be any of a variety of characteristics, such as a product number or UPC code. The identifying characteristic can be determined manually, such as by an operator. However, in the present instance, the induction station includes a scanning station 22 that may include a plurality of scanners, such as optical scanners in the form of a bar code scanner, digital camera or otherwise. The induction station may include a conveyor for conveying the items past the scanner or the operator may manually scan the items before they are fed into the system.

The induction station 20 optionally includes a conveyor such as a conveyor belt or a plurality of rollers for serially conveying items to a loading station where the items are loaded onto vehicles 200. A plurality of items may be loaded onto each vehicle. However, in the present instance, each item is loaded onto a separate vehicle and the vehicle then delivers the item to one of the storage locations.

Although the configuration of the induction station may vary, details of an exemplary induction station are provided in U.S. Pat. No. 10,494,192. The entire description of U.S. Pat. No. 10,494,192 is hereby incorporated herein by reference. Additionally, it should be noted that the induction station is not a necessary element and that aspects of the invention can be utilized in a system that does not include an induction station.

Referring again to FIGS. 1-4, the details of the storage assembly will be described in greater detail. The system includes a plurality of storage locations 40 for storing items so that the items may be retrieved. In one configuration, the items are delivered to the storage locations by a plurality of automated vehicles 200. Additionally, the system may be configured so that the items can be retrieved from the storage locations by the automated vehicles. Alternatively, the storage locations may be used to accumulate items so that an operator or other automated retrieval device can retrieve the items from the storage location. For instance, a storage bin 45 may be located in each storage location 40 and the system may deliver items to the different storage bins to fulfill customer orders. Once the system has delivered all of the items to a particular storage bin that are required for an order, an operator removes the storage bin 45 from the storage location 40 and replaces the full storage bin with an empty storage bin.

The storage locations may be arranged in any of a variety of orientations. For instance, referring to FIGS. 1-2, the system includes two opposing racks, a front rack 30 and a rear rack 32. The racks 30, 32 are spaced apart from one another, forming an aisle 35 between the racks. Optionally, the racks 30, 32 may be connected by a plurality of cross brackets that interconnect the racks. In particular, a plurality of top cross brackets may extend between the tops of the racks and a plurality of cross braces may extend between the bottoms of the racks thereby connecting the racks and maintain the racks spaced apart to provide the aisle 35.

The track 100 may follow any of a variety of configurations depending upon the application. One exemplary embodiment is illustrated in the FIG. 3, which includes a closed loop having a plurality of columns. Similarly, the system may be configured as a series of rows connected by vertical tracks. Additionally, the system may be an open track rather than a closed loop. Therefore, it should be understood that the loop configuration illustrated in the figures is only one example and that the track may take any of a variety of forms.

Referring again to FIG. 3, the track 100 optionally includes a horizontal upper rail 114 and a horizontal lower rail 116. A plurality of vertical legs 112 extend between the upper horizontal leg 114 and the lower horizontal leg 116. During transport, the vehicles travel up a pair of vertical legs from the loading station to the upper rail 114. The vehicle then travels along the upper rail 114 in the direction of travel identified by arrow Ti until reaching the column having the appropriate bin or destination. The vehicle then travels downwardly along two front vertical posts and two parallel rear posts until reaching the appropriate bin or destination, and then discharges the item into the bin or destination area. The vehicle then continues down the vertical legs until reaching the lower horizontal leg 116. The vehicle then follows the lower rail back toward the loading station.

Figure 5:
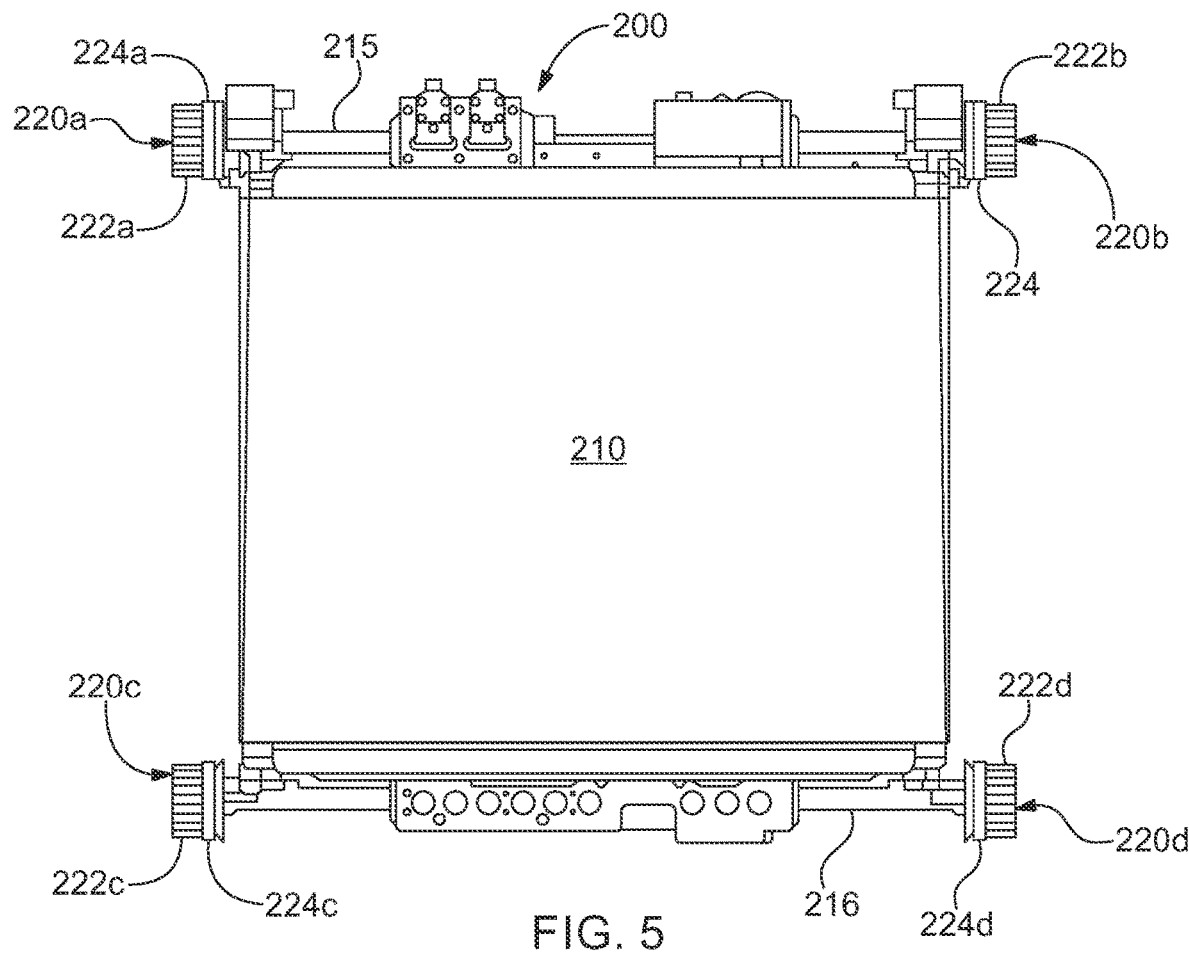
FIG. 5 is an enlarged plan view of a vehicle of the material handling apparatus illustrated in FIG. 1.

Referring to FIGS. 2 & 5, the track 100 includes a front track 105 and a rear track 110. The front and rear tracks 105, 110 are parallel tracks that cooperate to guide the vehicles around the track. In the discussion of the track, the front and rear tracks 105, 110 are similarly configured opposing tracks that support the forward and rearward wheels 220 of the vehicles. In particular, in the present embodiment the rear track 110 is mirror of the front track 105. Accordingly, a description of a portion of either the front or rear track also applies to the opposing front or rear track, except as stated otherwise below.

The details of the track may be substantially similar to the track as described in U.S. Pat. No. 7,861,844. The entire disclosure of U.S. Pat. No. 7,861,844 is hereby incorporated herein by reference.

Figure 4:
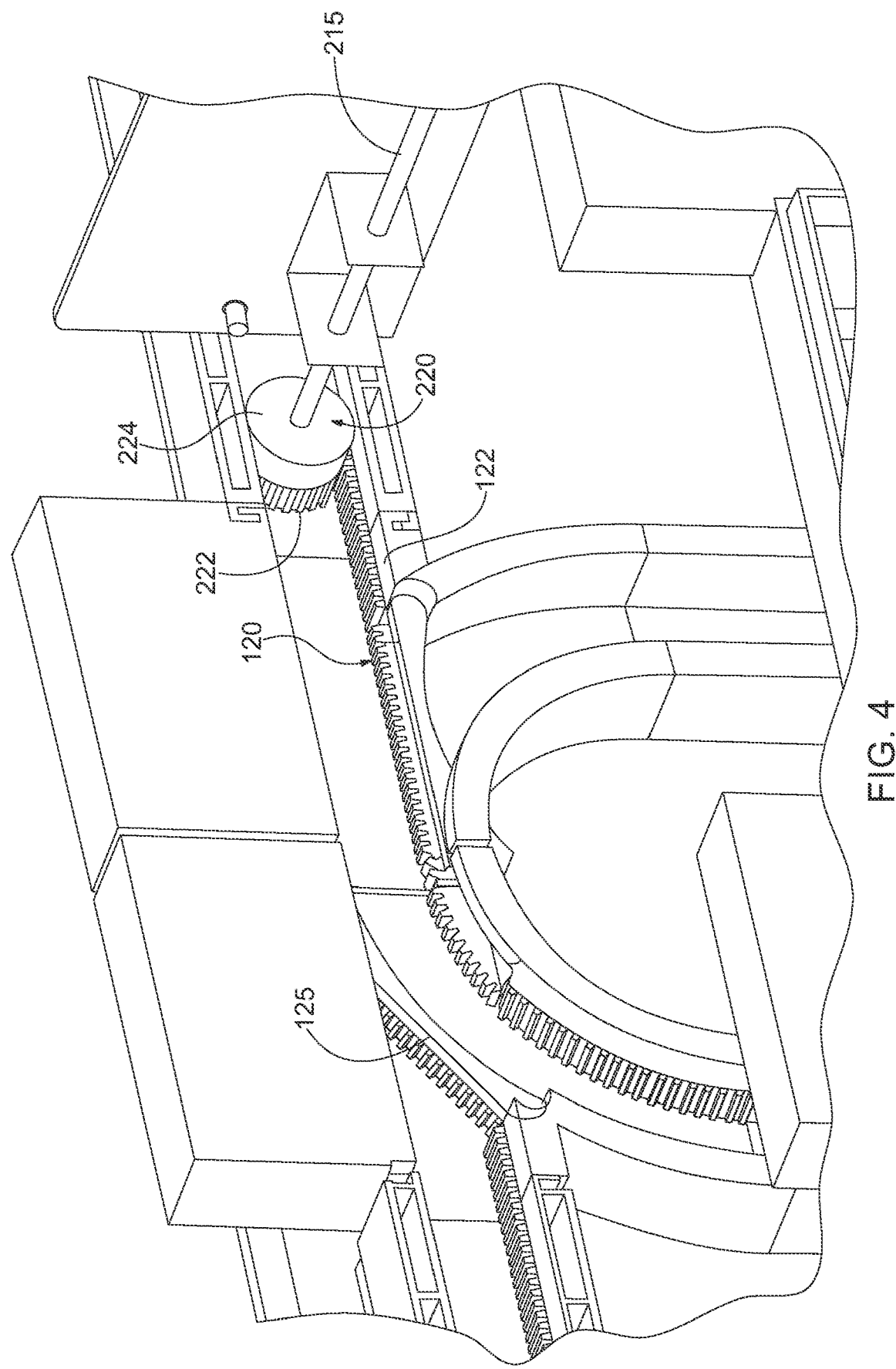
FIG. 4 is an enlarged perspective view of a portion of the track system of the material handling apparatus illustrated in FIG. 1.

Referring to FIG. 4, the track 100 includes a drive surface 120 that positively engages the cars to enable the car to travel along the track. The drive surface 120 may be any of a variety of configurations that engage drive elements on the vehicles. In particular the drive surface may be configured to mate with or mesh with drive elements on the vehicles. One such example of a drive surface 120 is a series of teeth, forming a rack that engages the wheels of the cars as described further below. Similarly, the track may include a series of recesses or detents that cooperate with corresponding elements, such as a sprocket or other element that projects from the wheels. In this way, the term "positively engaging" refers to engagement between the drive surface 120 and drive elements of the vehicle 200 that impedes the drive elements from sliding along the track 100.

Optionally, the track may also include a guide surface 122 in the form of a generally flat surface adjacent the drive surface 120. For example, the drive surface 120 may extend approximately halfway across the track and the guide surface 122 may extend across the other half of the track. As shown in FIG. 4, the drive surface 120 may be formed on an inner wall of the track and the opposing outer wall may be a generally flat surface parallel to the guide surface 122 of the inner wall.

As described above, the track may include a plurality of vertical legs 112 extending between the horizontal upper and lower rails 114, 116. An intersection may be formed at each section of the track at which one of the vertical legs intersects one of the horizontal legs. For instance, each intersection may include a pivotable gate 125 having a smooth curved inner race and a flat outer race that has drive surfaces that correspond to the drive surfaces 120 of the track. The gate 125 may pivot between a first position and a second position. In the first position, the gate 125 may be closed so that the straight outer race of the gate is aligned with the straight outer branch of the intersection. In the second position, the gate 125 may be open so that the curved inner race of the gate is aligned with the curved branch of the intersection.

In the foregoing description, the system 10 is described as having a plurality of output bins 45. However, it should be understood that the system may include a variety of types of destinations, not simply output bins. For instance, in certain applications it may be desirable to sort items to a storage area, such as an area on a storage shelf. Alternatively, the destination may be an output device that conveys items to other locations. Accordingly, one type of destination is a bin; a second type is a shelf or other location on which the item is to be stored; and a third type of destination is an output device that may be used to convey the item to a different location. The system may include one or more of each of these types or other types of destinations.

Delivery Vehicles

Figure 6:
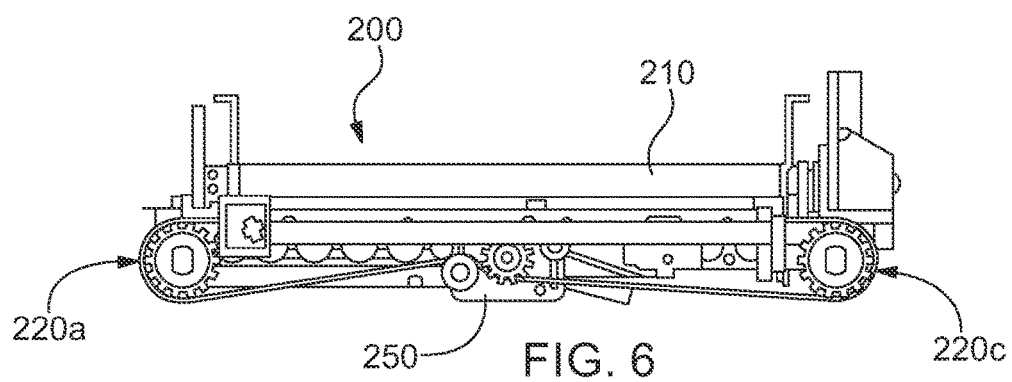
FIG. 6 is a side elevational view of the vehicle illustrated in FIG. 5.

Referring to FIGS. 5-6, the details of one of the delivery vehicles 200 will be described in greater detail. Each delivery vehicle 200 may be a semi-autonomous vehicle having an onboard drive system, including an onboard power supply. Each vehicle optionally includes a mechanism for loading and unloading items for delivery. An exemplary vehicle is illustrated and described in U.S. Pat. No. 7,861,844, which is incorporated herein by reference.

As discussed further below in detail, the vehicle includes a mechanism for driving the vehicle along the track 200. The drive mechanism may include any of a variety of elements. In the present instance, the drive mechanism includes a plurality of wheels 220 that engage the track 100.

Additionally, the vehicle 200 optionally incorporates a mechanism for loading an item onto the vehicle and discharging the item from the vehicle into one of the bins. The loading/unloading mechanism 210 may be specifically tailored for a particular application. For example, the delivery vehicle 200 may include a platform onto which an item may be placed. The platform 210 may be a stationary platform and the system may include elements operable to load items onto the platform and unload items from the platform. Alternatively, the platform may be moveable. For instance, the platform may be one or more horizontal belts. The belts may be selectively operable to convey an item onto the vehicle. Similarly, the belts may be selectively operable to discharge items from the belt. In the present instance, the loading/unloading mechanism 210 is illustrated as one or more conveyor belts that extend along the top surface of the vehicle. The conveyor belts are reversible. Driving the belts in a first direction displaces the item toward the rearward end of the vehicle; driving the belt in a second direction displaces the item toward the forward end of the vehicle.

The vehicle may include a conveyor motor mounted on the underside of the vehicle to drive the conveyor belts. The conveyor belts may be entrained around a forward roller at the forward edge of the vehicle, and a rearward roller at the rearward edge of the vehicle. The conveyor motor may be connected with the forward roller to drive the forward roller, thereby operating the conveyor belts.

The vehicle 200 includes a plurality of wheels. As shown in FIGS. 5-6, each of the vehicles may include four wheels 220: two forward wheels and two rearward wheels. The terms forward and rearward refer to the track in which the wheels ride as opposed to the direction of travel for the vehicle. Specifically, the forward wheels 220*a*, 220*c* ride in the front track 105, while the rearward wheels 220*b*, 220*d* ride in the rear track 110.

The wheels 220 are mounted onto two parallel spaced apart axles 215, 216 so that two of the wheels are disposed along the forward edge of the vehicle and two of the wheels are disposed along the rearward edge of the vehicle. Specifically, wheels 220*a* and 220*b* are mounted on leading axle 215, whereas wheels 220*c* and 220*d* are mounted on trailing axle 216. Axle 215 is referred to as the leading axle because when moving in a horizontal direction, the vehicle typically moves in a direction in which axle 215 is leading and axle 216 is trailing. However, it should be understood that the vehicle may be reversed so that axle 216 becomes the leading axle and axle 215 becomes the trailing axle. Accordingly, it should be understood that the terms leading and trailing do not imply a requirement or limitation on the orientation of the vehicle and its direction of travel.

Each wheel 220 may comprise a drive element 222 that cooperates with a drive surface of the track. The drive elements may be any of a variety of elements configured to mate with the drive surfaces 120 of the track. For example, the drive elements may be rotatable elements such as cogwheels or sprockets. In the present instance, the drive elements 222 are gears, such as pinion gears having a plurality of teeth.

Each wheel optionally includes a guide element in addition to the drive element 222. The guide element guides the wheel along areas of the track in which the track transitions from one direction to another direction. The guide element may also carry some of the load of the vehicle. According to one embodiment, the guide element may be a roller such as an idler roller 224. The roller 224 may be coaxially with and positioned next to the drive element 222. The idler roller 224 may engage the track to roll along the track while the drive element 222 engages the drive surface 120 to drive the vehicle along the track.

The drive element 222 may be fixed relative to the axle onto which it is mounted. In this way, rotating the axle operates to drive the drive element to drive the vehicle along the track 100. Optionally, the roller 224 may rotate relative to the axle onto which it is mounted so that the rollers do not provide a driving force driving the vehicle forwardly.

Optionally, the drive elements of the vehicle are configured so that a first drive element on the first axle engages the front track and a second drive element of the first axle engages the rear track. Similarly, a first drive element on the second axle engages the front track and a second drive element on the second axle engages the rear track. In this way, two spaced apart drive elements, such as gears 222a and 222c, engage the front track 105 and two spaced apart drive elements, such as gears 222b and 222d, engage the rear track 110.

The vehicle includes an onboard motor for driving the wheels 220. More specifically, the drive motor is operatively connected with the axles to rotate the axles 215, 216 which in turn rotates the gears 222 of the wheels.

The vehicle 200 may be powered by an external power supply, such as a contact along the rail that provides the electric power needed to drive the vehicle. However, in the present instance, the vehicle includes an onboard power source that provides the requisite power for both the drive motor and the conveyor motor. Additionally, in the present instance, the power supply is rechargeable. Although the power supply may include a power source, such as a rechargeable battery, in the present instance, the power supply is made up of one or more ultracapacitors.

Figure 8:
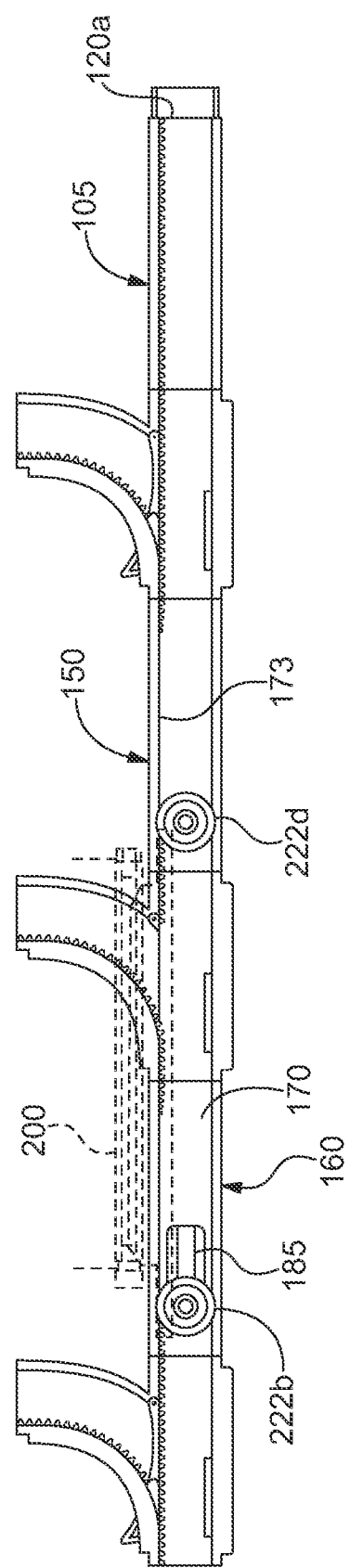
FIG. 8 is a side elevational view of a front assembly of the reorientation assembly illustrated in FIG. 7.
Figure 9:
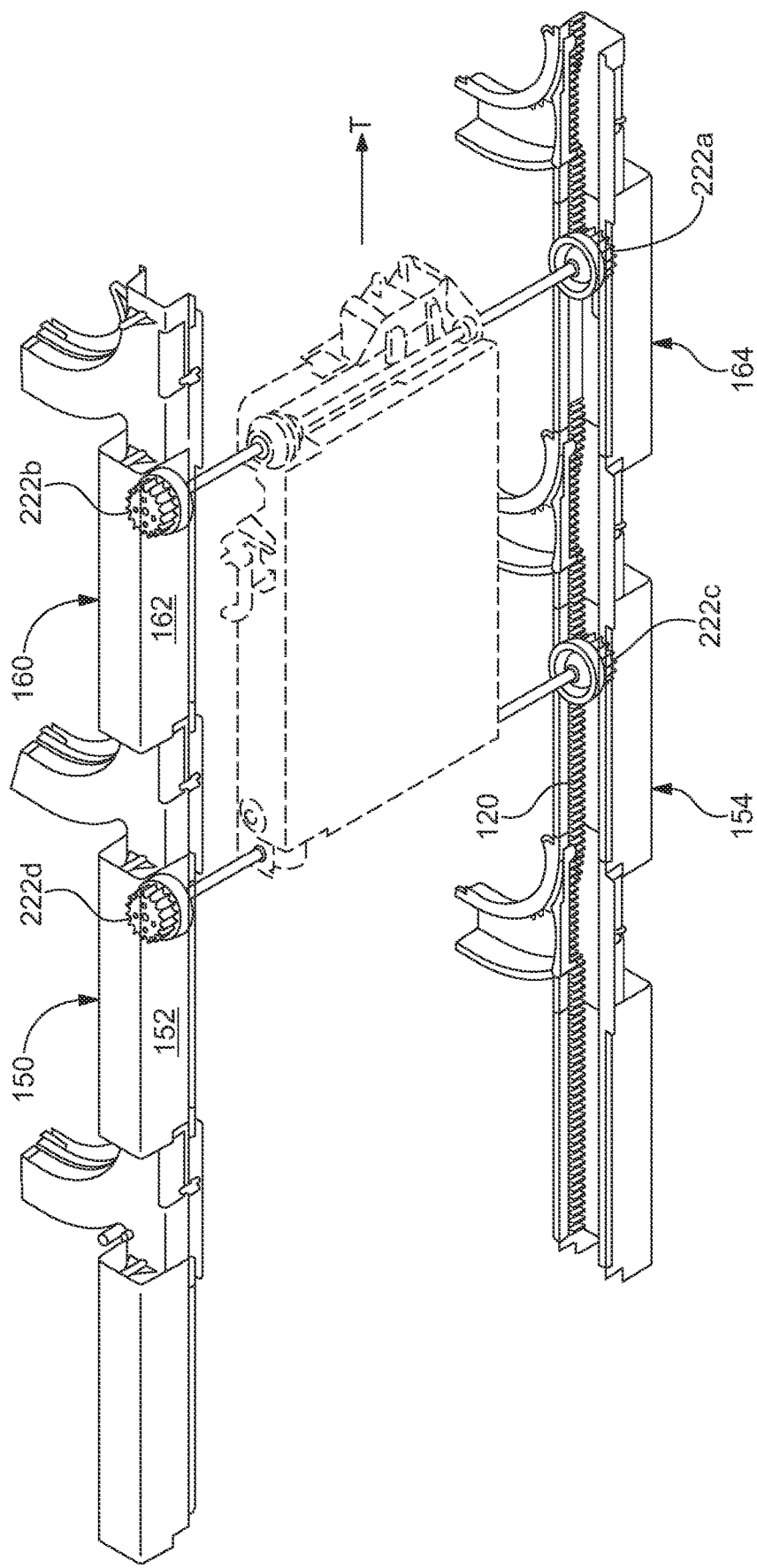
FIG. 9 is a second enlarged perspective view of the reorientation assembly of the material handling apparatus illustrated in FIG. 1.
Figure 10:
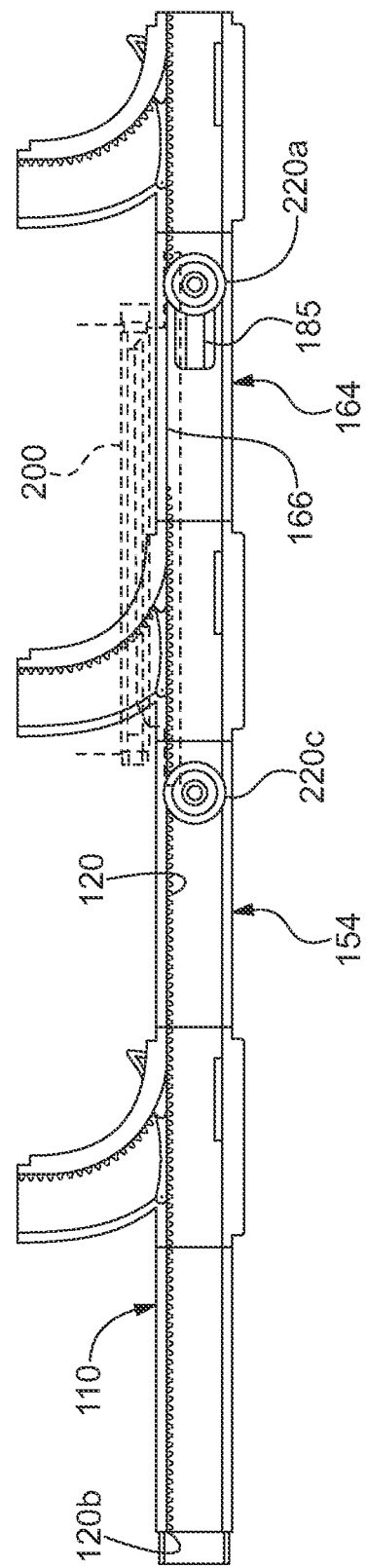
FIG. 10 is a side elevational view of a rear assembly of the reorientation assembly illustrated in FIG. 9.

During operation, the engagement between the vehicle drive elements 222 and the track 100 provide precise control of the position of the vehicle 200 along the track. Additionally, since the rear track 110 is a mirror of the front track 105, the opposing tracks controls the position of the forward wheels 220a, 220c relative to the rearward wheels 220b, 220d. Specifically, the drive surfaces on the front track 105 are aligned with the drive surfaces on the rear track 110. For instance, if the drive surfaces 120 are teeth as shown in FIGS. 8 & 10, the first tooth 120a along the front track 116 aligns with the first tooth 120b along the rear track. In this way, when the front drive element 222a on the leading axle engages first tooth element 120a of the front track 105, the rear drive element 222b on the leading axle 215 simultaneously engages first tooth element 120b on the rear track 110. Similarly, when the front drive element 222c on the trailing axle engages first tooth element 120a of the front track 105, the rear drive element 222d on the trailing axle 215 simultaneously engages first tooth element 120b on the rear track 110.

Because the drive surfaces of the track 100 tend to impede the drive elements 222 of the vehicle from sliding relative to the track, the positive engagement between the drive surfaces and the drive elements tends to maintain the vehicle in a proper orientation relative to the track. In particular, the aligned drive elements 222 and drive surfaces 120 tend to maintain the axles 215, 216 parallel to one another and perpendicular to the direction of travel along the track. Although the vehicles positively engage the track in a manner to limit slippage between the vehicle and the track, the drive elements of the vehicle may become misaligned over time, causing stress on the vehicle, leading to vehicle wear and/or the vehicles becoming jammed within the track.

To limit wear, the system may incorporate a section for automatically reorienting the vehicle relative to the track. For instance, the system may include a section that facilitates aligning the drive elements of the vehicles with the drive surfaces of the track. The re-orientation section may have any of a variety of configurations, however, the section is designed to provide a section of limited slip in which engagement between the drive elements and the drive surfaces is reduced or discontinued.

Referring now to FIGS. 7-12, a section for automatically re-orienting the vehicle relative to the track is designated generally 140. In the illustrated embodiment, the re-orientation assembly 140 is configured to reduce skew between the front side of the vehicle and the rearward side of the vehicle. For example, one of the front wheels (e.g. wheel 220a) may be offset from the opposing rearward wheel (e.g. wheel 220b) so that the two wheels are not positioned at the same point along the length of the track. Specifically, the distance from wheel 220a to tooth 120a may be greater than the distance from wheel 220b to tooth 120b. Such offset wheels may cause the axle 215 to bend or to become angled relative to the direction of travel T. For instance, as discussed above, in the illustrated embodiment, when the vehicle is properly oriented, the axles 215, 216 are oriented perpendicular to the direction of travel. When the wheels 220 become offset the axles may bend or skew to an angle that is non-perpendicular to the direction of travel.

The re-orientation section 140 may include one or more segments depending on the configuration of the vehicles 220. In one example, as illustrated in FIG. 8, the re-orientation section 140 includes a first segment 150 and a second segment spaced 160 apart from the first segment. Although the spacing between the first and second segments may vary, the first segment 150 is spaced apart from the second segment 160 a distance along the track similar to the spacing between the leading axle 215 and the trailing axle 216. In this way, the wheels of the trailing axle 216 may engage the first segment 150 while the wheels of the leading axle 215 engage the second segment 160 (see FIGS. 7-8).

Referring to FIGS. 7-12, the first segment 150 of the re-orientation section 140 includes a front assembly 152 and an opposing rear assembly 154. The front assembly 152 is positioned along the front track 105 and the rear assembly 154 is positioned along the rear track 110. As discussed further below, the front assembly 152 may be a mirror of the rear assembly 154 so that the front assembly and the rear assembly are substantially the same. Optionally, the front assembly 152 may be configured differently than the rear assembly 154, as discussed further below.

Figure 7:
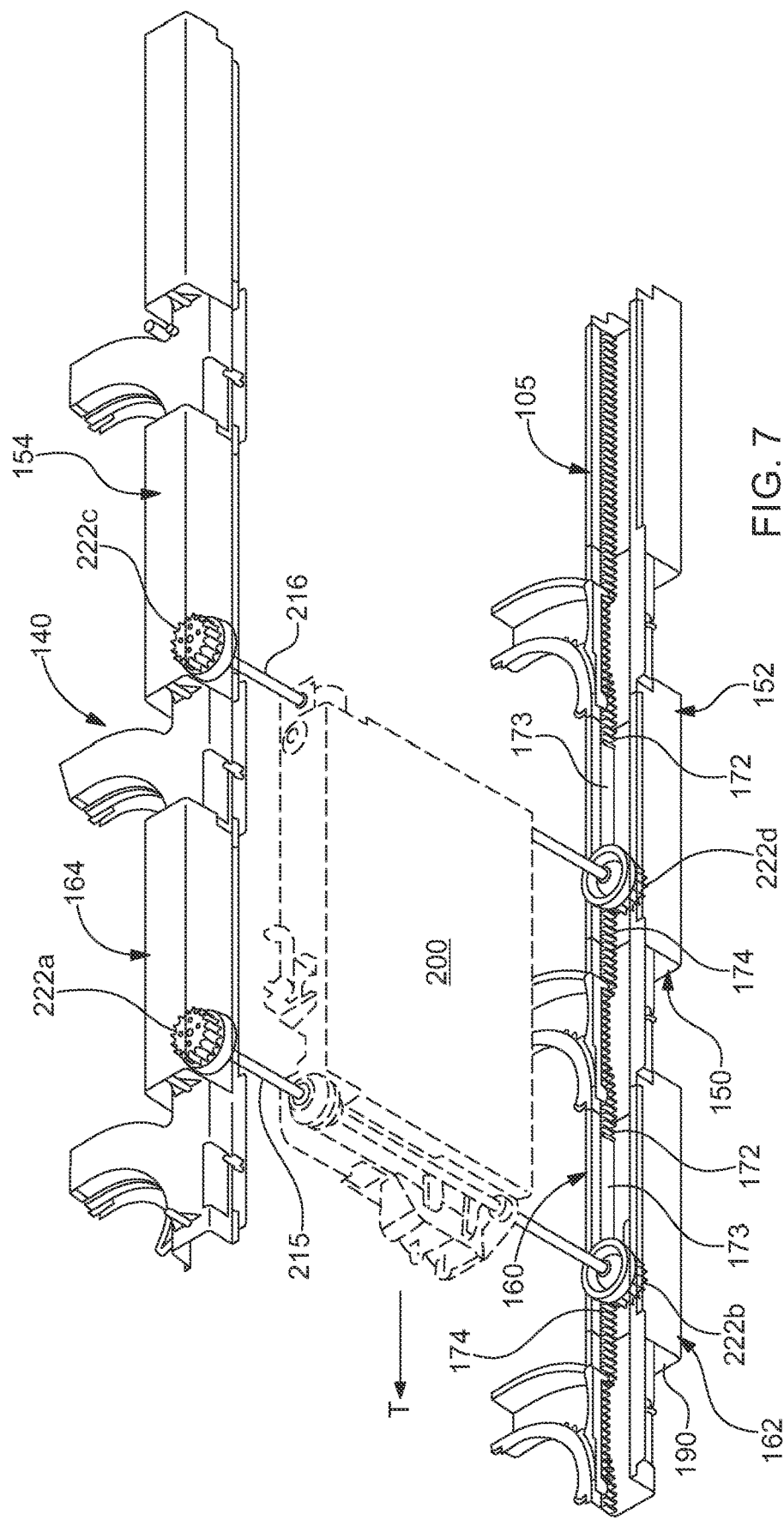
FIG. 7 is an enlarged perspective view of a reorientation assembly of the material handling apparatus illustrated in FIG. 1.

Referring to FIGS. 7-8, the first segment 150 includes front assembly 152 and rear assembly 154. The second segment 160 includes front assembly 162 and rear assembly 164. The different segments are designated according to the direction of travel of the vehicle. For instance, as shown in FIG. 7, the typical direction of travel for the vehicle is designated by arrow T. When the vehicle travels in direction T, the leading edge of the vehicle is conveyed through the first segment 150 of the reorientation assembly 140. As the vehicle continues along the path in the direction T, the leading edge is conveyed through the second segment 160. However, it should be understood that the placement of the segments of the reorientation assembly 140 may vary depending upon a number of factors, including, but not limited to, the primary direction of travel of the vehicles along the track.

Figure 11:
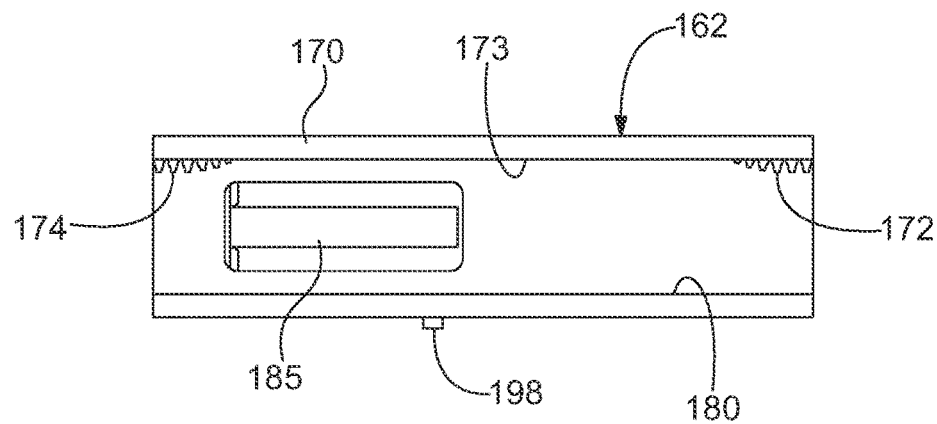
FIG. 11 is an enlarged side view of a segment of the reorientation assembly illustrated in FIG. 7.
Figure 12:
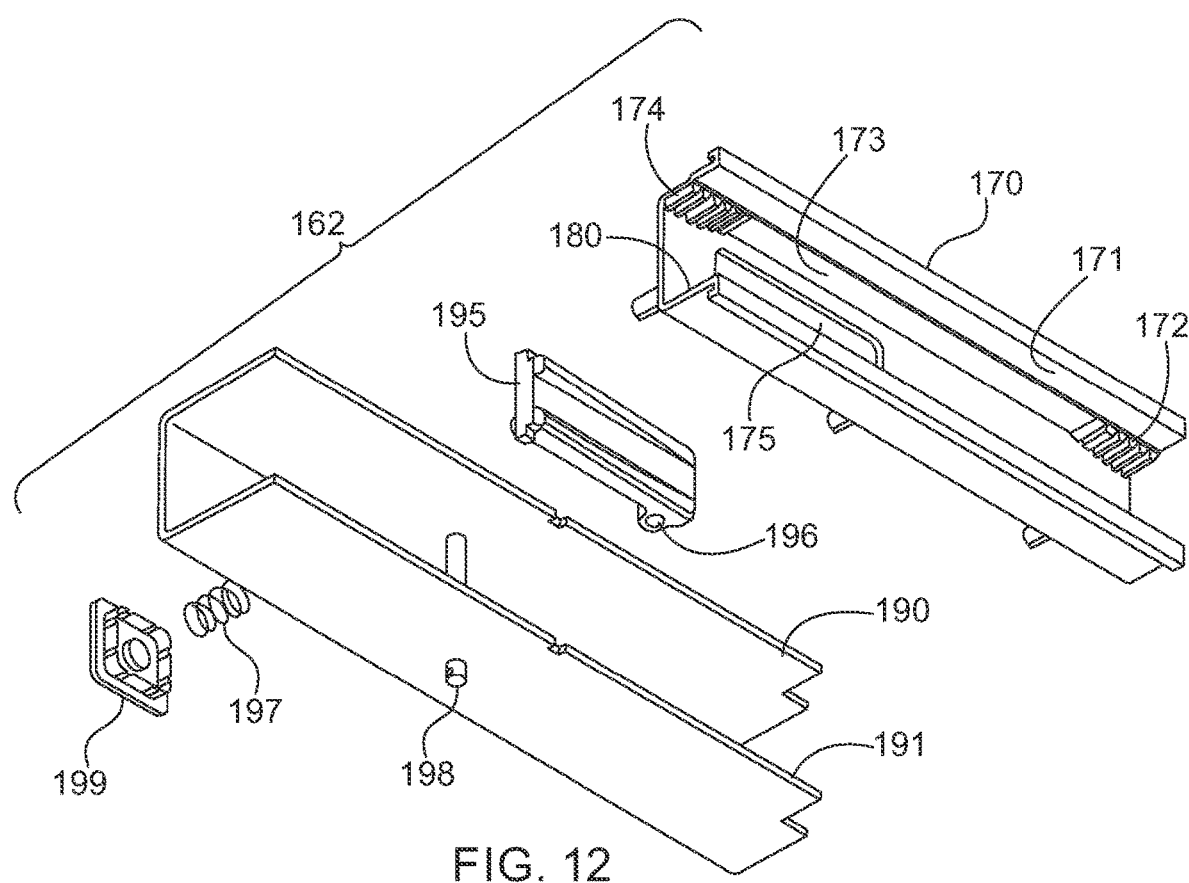
FIG. 12 is an exploded perspective view of the segment illustrated in FIG. 11.

As noted above, the first and second segments 150, 160 of reorientation assembly 140 each include a front assembly 152, 162 along the front track 105. Referring to FIGS. 11 and 12, details of the front assembly 162 of the second segment 160 will be described in greater detail. The front assembly includes a track section 170. The track section 170 has a generally c-shaped channel cross-sectional profile. Specifically, a bottom wall 180 of the track forms a first wall of the channel and an opposing upper wall opposing the bottom wall forms a second wall. The upper and lower walls are connected be an elongated web that extends between the upper and lower walls.

The upper wall of the track segment 170 optionally includes a plurality of surfaces. For instance, the upper wall may include a generally flat guide surface 171 opposing the lower wall and extending substantially the entire length of the track segment 170. The guide surface 171 may form a recess that extends the length of the upper wall. Additionally, the guide surface 171 may be spaced apart from the lower wall 180 a distance similar to the diameter of the guide wheels 224 of the vehicle wheels. The guide wheels have a generally smooth surface that provide rolling engagement between the guide wheels and the guide surfaces 171, 180.

The upper wall also includes a sliding surface 173 configured to facilitate sliding between the drive elements 222 of the vehicle and the track 100. For instance, the sliding section 173 may be configured to provide a gap between the outer surface of the drive elements 222 and the drive surface 120 of the track. The sliding surface 173 is aligned with the drive surface 120 of the track 100. In this way, the sliding surface forms a gap between a length of drive surface 120 on one portion of the track and a separate length of drive surface on a second portion spaced apart from the first portion.

For example, referring to FIG. 12, a first drive surface 172 may be formed on the upper wall at a first end of the track segment 170. The first drive surface 172 is formed similarly to the drive surface 120 of the track 100. For instance, the first drive surface 172 may be a plurality of spaced apart teeth that mesh with the gears 222. Additionally, the track segment 170 may include a second drive surface 174 formed on the upper wall at a second end of the track segment 170. The second drive surface is formed similarly to the drive surface 120 of the track, such as a plurality of spaced apart teeth like the first drive surface 172. The second drive surface 174 is spaced apart from the first drive surface forming a gap between the two drive surfaces. The sliding surface 173 extends between the first drive surface 172 and the second drive surface 174.

As mentioned above, the sliding surface 173 is configured to facilitate sliding between the track 100 and drive elements 222 of the vehicle wheels 220. For instance, sliding surface 173 may be configured so that the sliding surface is spaced apart from the lower wall 170 a distance greater than the outer diameter of the drive elements 222. For instance, sliding surface 173 may be a smooth planar wall so that the drive elements 222 of the vehicle wheels do not positively engage the sliding surface. In this way, the drive elements 222 may slide relative to the sliding surface 173.

As described above, the sliding surface 173 of the track segment 170 allows a wheel of the vehicle to slide relative to the track. In this way, the sliding surface facilitates realignment of a wheel on one side of the track relative to the opposing wheel on the other side of the track. For instance, if front wheel 222a skips one or more teeth in the front track 105, the front wheel 222a may become skewed relative to the back wheel 222b in the rear track 110. More specifically, the wheel at one end of an axle 215 may become offset relative to the wheel at the second end of the axle. When one of the wheels is skewed or misaligned relative to a second wheel, the skew or misalignment may cause excessive wear and/or a jam between the vehicle and the track. As discussed further below, the sliding surface 173 allows the vehicle wheels to slide relative to the track to reorient the wheels to reduce skew and/or misalignment of the vehicle wheels.

The reorientation segment 160 provides an elongated segment in which the drive surfaces 120 of the track are modified or discontinued so that the drive elements 222 of the vehicle are disengaged from the drive elements. As shown in FIG. 11, the reorientation assembly may include one or more transition section to transition the drive elements of the vehicle from engaging with the drive surfaces to non-engaging and from non-engaging to engaging with the drive surfaces. For example, drive surface 172 is configured to have a first end that substantially matches the configuration of the drive surfaces 120 of the track. The second end of the drive surface tapers from the configuration of a full drive surface to a reduced drive surface and/or to no drive surface. For example, in the illustrated embodiment, the drive surfaces are teeth, such as a rack and the drive surface 172 tapers from a full-sized tooth to a reduced height tooth to no tooth. In this way the meshing between the gear teeth 222 on the vehicle 200 and the drive surface 172 progressively disengages. Similarly, the drive surface 174 tapers in the reverse direction to progressively mesh with the gear teeth 222 of the vehicle. Specifically, the second drive surface 174 tapers from either no teeth or a reduced tooth height to a full tooth height that matches the configuration of the drive surfaces 120 of the track 100.

Although the transition sections 172, 174 are illustrated as being integral with the track section 170, it should be understood that the transition sections 172, 174 may be formed on adjacent sections of the track 100 so that the sliding surface 173 extends further along the track segment 170.

Optionally, the reorientation assembly 140 may further include a secondary reorienting device. For instance, the reorientation assembly may include a centering element for limiting skew of the vehicle relative to the desired direction of travel. An example of such a centering device is illustrated in FIGS. 11-12 in the form of a deflector 195 configured to deflect the vehicle toward the desired direction of travel. The deflector 195 may be any of a variety of elements designed to apply lateral force on the side of the vehicle.

In the present instance, the deflector 195 includes one or more biasing elements that urge the vehicle toward the centerline between the front and rearward tracks 105, 110. Specifically, the deflector includes a pivotable lever that pivots about a pivot pin 198. The pivot pin 198 extends through a bore hole 196 in the deflector 195. In this way, the pivot pin 198 forms a pivot axis so that the deflector pivots about an axis that is preferably transverse to the direction of travel T (See FIGS. 7-10).

The deflector 195 projects through an aperture or window 165 in the web of the track segment 160. In the present instance, a biasing element, such as a spring 197 biases the deflector 165 toward the center of the aisle 35. In other words, the deflector 165 is biased to urge against the side of the vehicle 200. In this way, as the vehicle passes through the reorientation section, the deflector 195 may reorient the vehicle toward the center of the aisle. Additionally, referring to FIGS. 8 & 10, an opposing deflector 195 may be positioned in the rearward track 110 so that the opposing deflector urges against the opposite side of the vehicle 200. In this way the two opposing deflectors urge the two sides of the vehicle toward the center of the aisle. For instance, as shown in FIG. 8, the deflector 195 in the front assembly 162 urges against the front side of the vehicle and the deflector 195 in the rear assembly 164 urges against the rearward side of the vehicle. Preferably, the opposing deflectors are balanced so that they provide substantially similar biasing forces, thereby urging the vehicle toward the center of the aisle to guide or reorient the center of the vehicle toward the center of the aisle.

As noted above, the reorientation segment 162 may include a housing 190 that houses the track segment 170 and the deflector 195. For instance, the housing may be a C-shaped channel having a width and depth large enough that the track segment can fit within the housing. As shown in FIG. 12, the track segment 170 may have an upper and lower lip that fit over the outer edges 191 of the housing 190. The track segment may be fixedly affixed to the housing, such as by releasable fastener (e.g. threaded fasteners) or by permanent means, such as welding, epoxy or adhesive.

The housing is optionally deep enough to provide clearance for the deflector 195. Specifically, all, or substantially all of the deflector 195 may fit within the housing below the track so that the deflector does not substantially protrude into the track. In this way, the deflector 195 may be deflected or retracted into the housing 190 out of the path of the vehicle.

The pivot axis of the deflector 195 is optionally positioned below the surface of the web that connects the upper and lower legs of the track segment. For instance, in the present instance, the pivot axis 196 is positioned in a gap between the track segment 170 and the housing 190. In particular, the pivot pin 198 is positioned below the track segment so that pivot pin does not extend through the track segment.

Optionally, the deflector 195 includes a biasing element 197 biasing the deflector inwardly toward the center of the aisle 35. FIG. 12 illustrates an exemplary biasing element in the form of a coil spring. The deflector may be configured to cooperate with the coil spring, such as a post that extends into the coil spring or a recess that receives a first end of the coil spring. The second end of the spring may bear against the interior wall of the housing. Alternatively, an aperture may be formed in the wall of the housing and a cover 199 may overlie the aperture in the housing. The biasing element 197 may bear against the interior surface of the cover. The cover 197 may be releasably or substantially permanently connected with the housing 190.

The reorientation assembly 140 may include one or more reorientation segments 152 as described above. For instance, as illustrated in FIGS. 8 and 10, the second reorientation section 160 may include a front reorientation segment 162 along the front track 105 and a rear reorientation segment 164 opposing the front orientation segment 162. The rear reorientation segment 164 may be configured substantially similarly to front reorientation segment 160 with the rear reorientation segment being substantially a mirror of the front reorientation segment.

The reorientation segment may include one or more reorientation elements. For instance, front reorientation assembly 162 of the second segment 160 includes both the sliding surface 173 and the deflector 195. Referring to FIGS. 8 and 10, the first reorientation segment 150 may similarly have both a sliding surface for reorienting the vehicle and a secondary reorientation element, such as the deflector. Alternatively, the first reorientation segment 150 may include a track segment configured similarly to track segment 170, but the first segment 150 may omit the deflector 195.

Referring again to FIGS. 8 and 10, the first reorientation segment 150 may include a front section 152 that includes a sliding surface 173 and a rear section 154 that includes a track section having driving surfaces opposing the sliding surface 173. Specifically, rear assembly 154 of the first reorientation segment 150 includes a track having drive surfaces 120 along substantially the entire length of the assembly. The drive surfaces 120 provide a positive drive mechanism through the entire length of the first segment.

In this way, the reorientation assembly may be configured in a number of variations that permit various elements of the vehicles to slide relative to the track at different areas of the reorientation assembly. As described above, the first reorientation segment 150 has a first sliding surface on one side and drive surfaces on the opposing portion of the track so that the front wheel of the vehicle may slide relative to the track while the rear wheel remains engaged with the track.

Additionally, the second reorientation segment 160 has a first sliding surface on one side and a second sliding surface on the opposing side so that both the front and rear wheels may slide relative to the track at the same time.

Optionally, the second reorientation segment 160 is spaced apart from the first reorientation segment 150 a distance similar to the distance between the leading axle 215 and the trailing axle 216. In this way, the reorientation assembly 140 may allow three of the four corners of the vehicle to slide relative to the track 100 while the fourth corner of the vehicle remains engaged with the track. For instance, as described above, when the leading wheels 220a,b engage the second reorientation segment 160, the drive elements 222a, 222b are aligned with the sliding surfaces 173 so that the drive elements 222a, 222b are disengaged from the track. While the leading wheels engage the second reorientation segment, the trailing wheels 220c,d engage the first reorientation segment 150 so that front drive element 222c is aligned with the sliding surface of the front segment while the rear drive element 222d is aligned with the drive surfaces. In this way, the drive element of a single wheel of the vehicle engages the drive surfaces of the track to drive the vehicle through the reorientation section while the remaining wheels 222a,222b,222c are disengaged from the drive surfaces of the track 100.

It should be understood that the configuration of the reorientation assembly 140 may be varied depending on a variety of factors. For instance, as noted above, it may be desirable to incorporate a supplemental or secondary reorientation element such as deflector 195 into one or more of the reorientation segments. However, the reorientation assembly 140 may be configured without such secondary reorientation elements. Similarly, in the foregoing example, the reorientation assembly includes three segments that allow three wheels of the vehicle to simultaneously disengage from the drive surfaces of the track.

It may be desirable to reduce the number of segments that allow the wheels to disengage from the drive surfaces of the track. For instance, the reorientation assembly may include two segments that allow the wheels to simultaneously disengage the drive surfaces of the track. In one example, the two segments may oppose one another so that the two wheels that simultaneously disengage are on the same axle. Alternatively, the two segments may be spaced apart along the length of the track so that the two wheels that simultaneously disengage are spaced apart along the length of the vehicle. For instance, the two segments may be spaced apart a distance similar to the spacing between the leading axle 215 and the trailing axle 216.

Referring now to FIGS. 13-16, an alternate embodiment of the skew correction assembly or reorientation assembly 440 for use in the material handling apparatus 10 is illustrated. The alternate reorientation assembly 440 is similar to the reorientation assembly 140 illustrated in FIGS. 7-12. However, as described below, the alternate reorientation assembly 440 may include an alterative secondary reorientation element 485. As described above, the reorientation assembly 140 in FIGS. 7-12 may include an optional deflector 195 that operates as a secondary reorientation element by deflecting the vehicle in an attempt to center the vehicle between the front track 105 and the rear track 110. The alternate reorientation assembly 440 comprises a plurality of track elements that are substantially similar to the system illustrated in FIGS. 7-12. However, the system in FIGS. 13-16 includes a stationary element that provides a secondary reorientation element 485 rather than the movable deflector 195.

As shown in FIGS. 13-16 the alternate reorientation assembly 440 allows three wheels of the vehicle to simultaneously slide along the track. For instance, the first reorientation segment 450 may include a front assembly 452 and a rear assembly 456. The front assembly 452 may include a drive surface 455 similar to the drive surface 120 of rear assembly 154 in FIGS. 7-12. In contrast, the rear assembly 494 may include a sliding surface 466 similar to assembly 164 in FIGS. 7-12. Similarly, the second reorientation segment 460 may include opposing front and rear assemblies 462, 464 configured substantially similar to rear assembly 164 so that the assembly has a sliding surface 466.

More specifically, the three assemblies, 456, 462 and 464 may be configured substantially similar to one another. Each assembly may include a sliding section 466 formed in the track similar to sliding surface 173 so that the vehicle wheel can slide along the sliding section. Additionally, similar to the assembly shown in FIG. 12, assemblies 456, 462, 464 may each include transition areas similar to transition elements 172 and 174 in which the track segment transitions from a drive element to the sliding surface or from the sliding surface to the drive elements.

Figure 13:
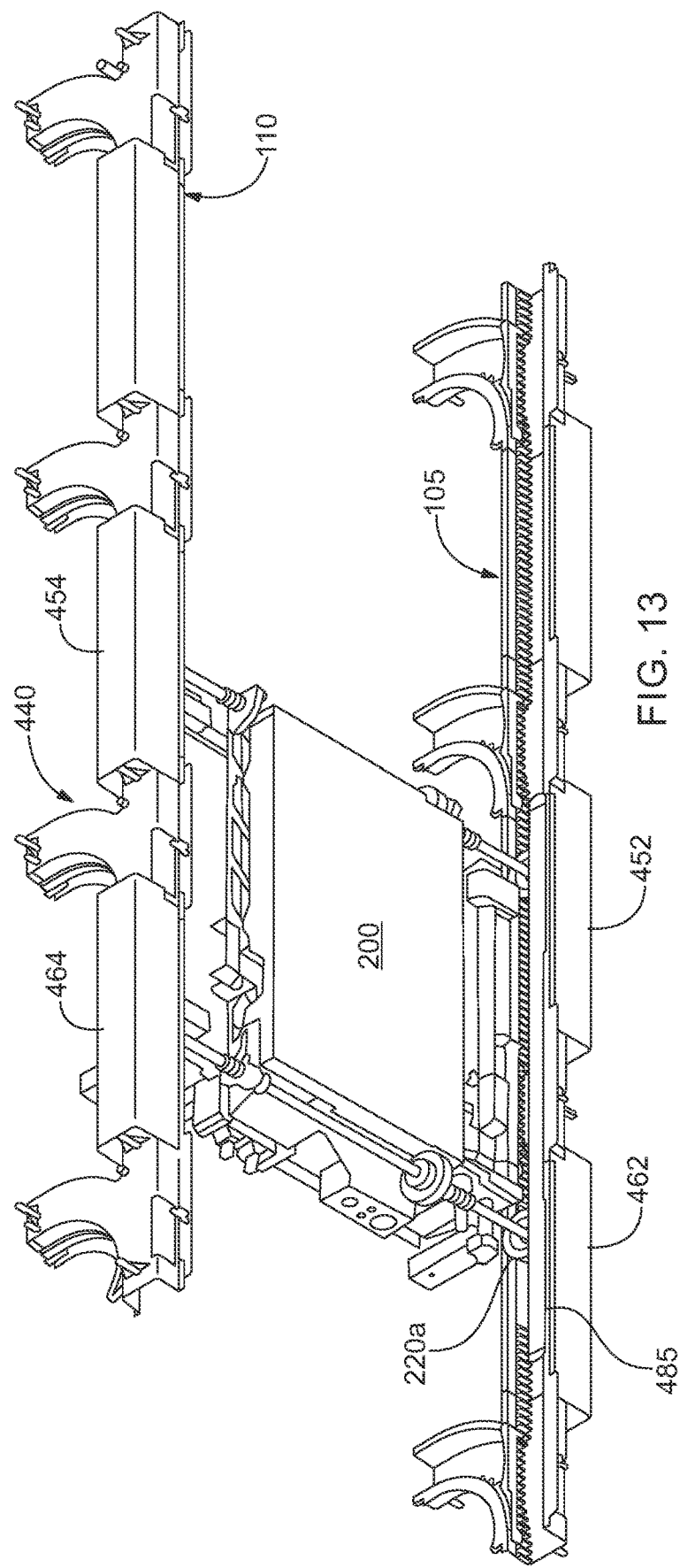
FIG. 13 is an enlarged perspective view of an alternate reorientation assembly of the material handling apparatus illustrated in FIG. 1.
Figure 14:
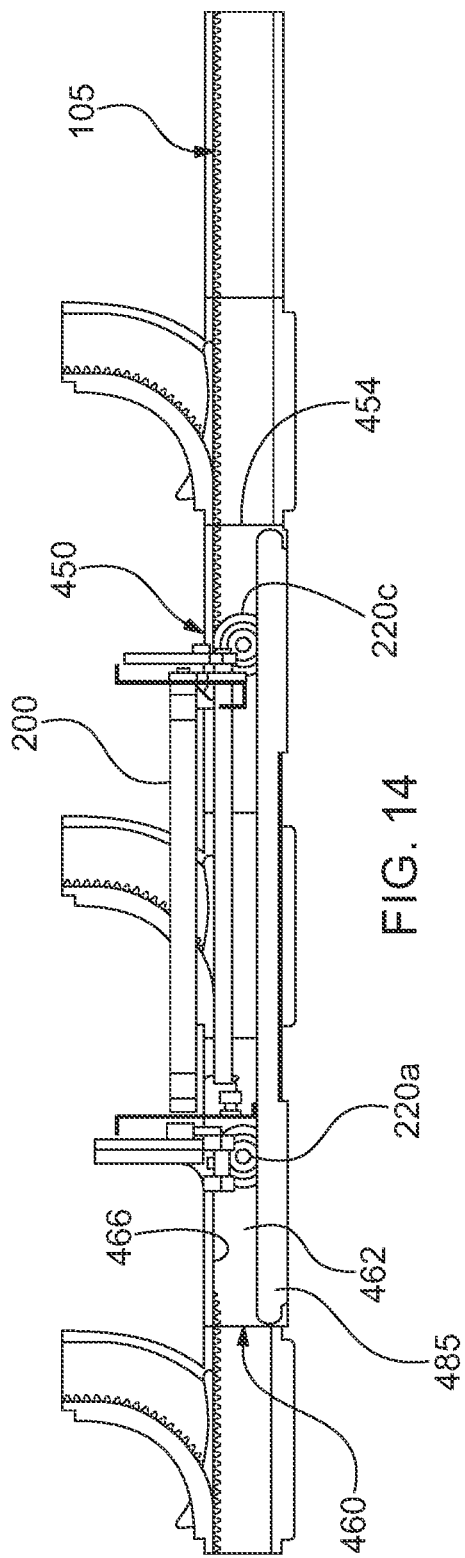
FIG. 14 is a side elevational view of a front assembly of the reorientation assembly illustrated in FIG. 13.

The alternate secondary reorientation element 485 includes an elongated guide or fence. The fence 485 includes a generally vertical wall extending along the inner edge of the track. In FIGS. 13-14 the fence is illustrated as being attached along the inner edge of the front track 105, however, it should be understood that the fence may be positioned along the rear track instead.

Figure 16:
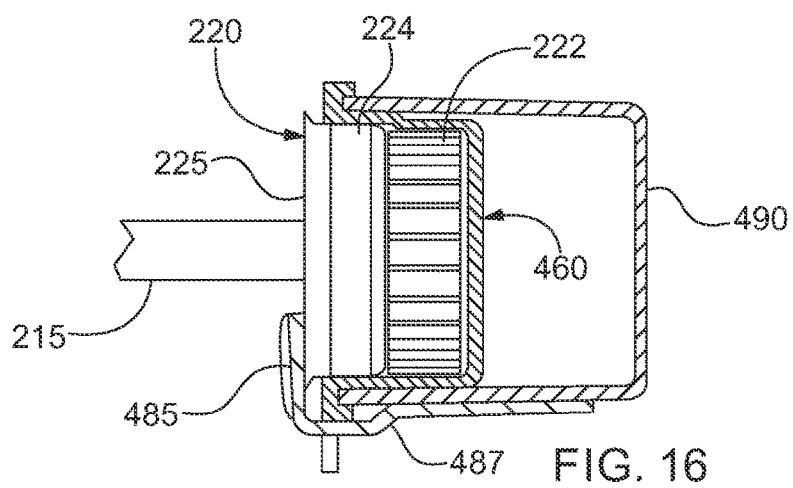
FIG. 16 is an enlarged sectional view taken along the line 16-16 in FIG. 15.

FIG. 16 illustrates a sectional view of the front assembly 460. The fence 485 projects upwardly from the inner edge of the track forming a lateral stop impeding lateral displacement of the wheel relative to the track. In this instance, lateral displacement is horizontal displacement that is transverse the direction of travel.

The fence is positioned so that the fence is spaced apart from the inner surface of the track a distance similar to the thickness of the wheel 220. For instance, the distance from the inner surface of the fence 485 to the inner surface of the track is less than approximately 120% of the width of the wheel 220. Preferably, the distance from the inner surface of the fence 485 to the inner surface of the track is less than approximately 110% of the width of the wheel 220. In this way, the fence and the inner surface of the track form guides that constrain lateral movement of the wheel transverse the direction of travel T. Similarly, the fence and the inner surface of the track form guides that constrain the ability of the wheel to twist or skew about a vertical axis.

The fence may be formed as a generally L-shaped structure having a lower leg 487 forming a bracket for attaching the fence to the track. In this way, the lower leg 487 may be fixedly connected with a lower surface of the housing 490 of the track.

Figure 15:
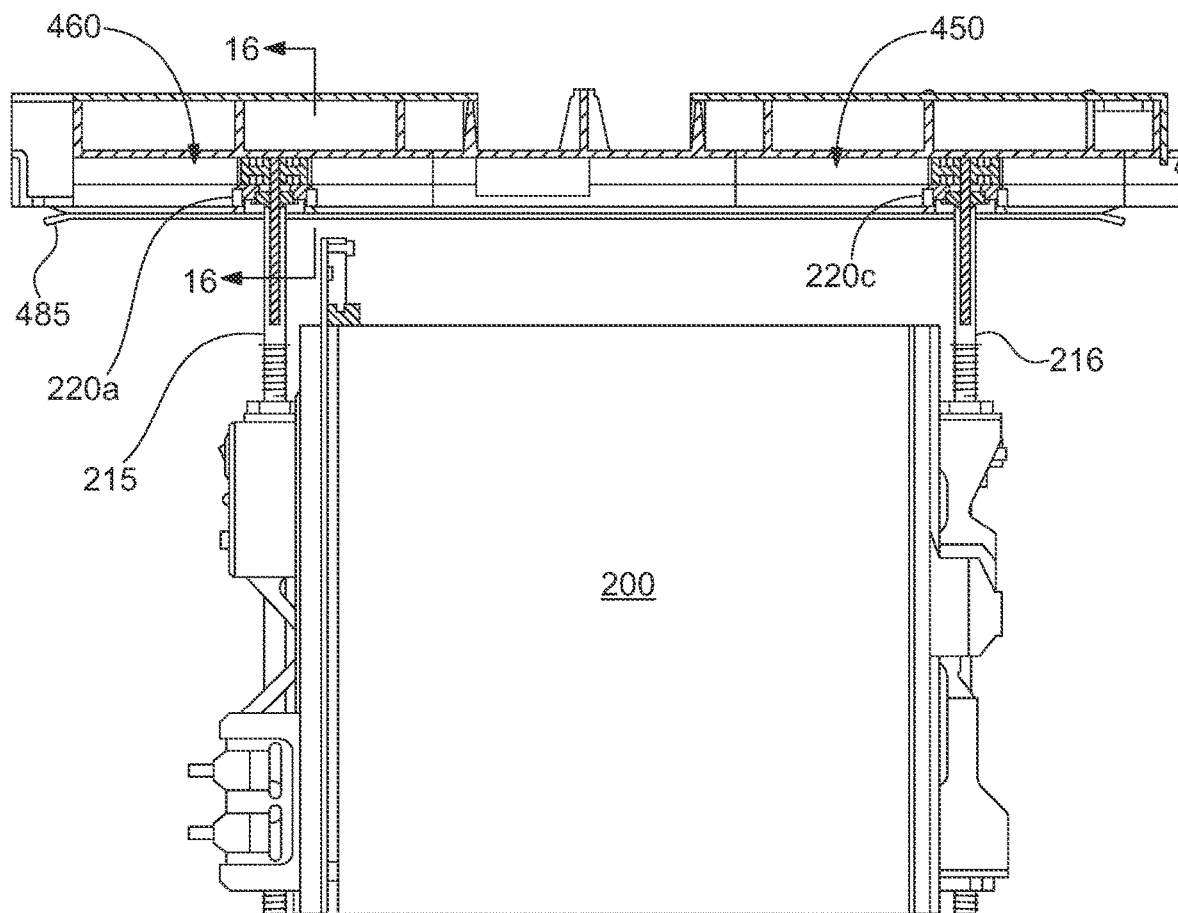
FIG. 15 is a fragmentary plan view of the alternate reorientation assembly illustrated in FIG. 13.

Referring to FIG. 14, the fence 485 extends along the length of the reorientation assembly 440. The fence 485 may be a single element or a plurality of elements may be positioned along the length of the reorientation assembly 440. For instance, as shown in FIGS. 13-15, the fence may be a single guide extending along both the first reorientation segment 450 and the second reorientation segment 460. However, the fence may be separate guides, such as a first fence positioned along the first reorientation segment 450 and a second fence that is spaced apart from the first fence and positioned along the second reorientation segment 460. Either way, preferably the fence is elongated having a length at least as long as the shorter of the first and second reorientation segments 450, 460. Further still, the fence may have a length that is at least as long as the length of both the first reorientation segment and the second reorientation segment combined. Accordingly, the fence 485 is sufficiently long to impede lateral displacement of the vehicle 200 while three of the four wheels are disengaged from the drive surface 120 of the track 100.

Method of Use

The system 10 provides an apparatus for automatically delivering and/or sorting a plurality of items using a plurality of vehicles 200. Items may be scanned at an input station 20 and loaded onto the vehicles at a loading station adjacent the input station. From the loading station, the vehicles travel vertically and horizontally along a track to one of a variety of destination areas, such as one or a plurality of sort bins 40. At the appropriate sort bin 40, a vehicle 200 may transfer an item into the sort bin. After delivering the item, the vehicle continues along the track to return to the loading station to receive another item. The vehicle may continue to loop around the track picking up items at the loading station and delivering items to the sort bins.

As the vehicles move along the track, the vehicles positively engage the track. In particular, the track comprises a plurality of drive surfaces and the vehicles comprise a plurality of drive elements that mate with the drive surfaces of the track. The mating drive elements and drive surfaces impede the vehicle wheels from sliding along the track relative to the drive surfaces.

As the vehicles travel along the track, the vehicles may be reoriented relative to the track as the vehicles move along the track. In other words, the vehicles are reoriented while the vehicles move. The vehicles may be reoriented to correct a variety of potential misalignments between the vehicles and the track that can lead to excess wear or jamming. For instance, the vehicles may be reoriented to reduce or eliminate skew between wheels on opposing sides of the track. For example, the drive elements of a wheel on a first side of the vehicle may disengage the drive surface on the track while the drive element on a second side of the vehicle remains engaged with the drive surfaces on the track. When the drive elements of the wheel on the first side disengage the drive surfaces of the track, the wheel on the first side is free to move relative to the track, thereby reducing misalignment of the wheel on the first side relative to the wheel on the second side.

Additionally, the vehicles may be reoriented by simultaneously disengaging the drive elements of multiple wheels from the drive surfaces of multiple segments of the track. In this way, the drive elements of multiple wheels are free to move relative to the track while the drive elements of at least one wheel remain positively engaged with the track to drive the vehicle forward.

For example, the vehicles 200 may pass through a reorientation section 140 as the vehicles travel along the track 100. The leading wheels 220a, 220b may pass through a first segment 150 of the reorientation section while the trailing wheels 220c, 220d engage the teeth 120 in the forward and rear tracks 105, 110. As the leading wheels 220a, 220b pass through the first segment 150, drive elements, such as gear 222a of the first wheel 220a, are displaced along the sliding surface 173 of track 170. As the gear 222a is displaced along the sliding surface 173, the gear 222a is disengaged from positive engagement with the track. If the front wheel 220a is skewed relative to the rear wheel 220b, the front wheel will tend to reorient into alignment with the rear wheel when the gear 222a of the front wheel is disengaged from the track along the sliding surface 173. If the front wheel 220a is aligned with the rear wheel 220b, the leading axle 215 will tend to be oriented in a desired orientation, such as normal to the direction of travel T. If the front wheel is misaligned from the rear wheel on the leading axle 215, the leading axle may deflect or skew relative to the desired orientation. As the leading edge of the vehicle passes through the first orientation section, the deflection or skew of the leading axle may displace the front wheel 220a relative to the rear wheel 220b when the front wheel is released while the rear wheel remains engaged.

After passing through the first reorientation segment 150, the leading wheels 220a, 220b reengages the drive surfaces 120 of the track so that the leading wheels positively engage the track. The vehicle continues to move forwardly so that the leading wheels move through the second reorientation segment 160. As the leading wheels move through the second reorientation segment 160, the rear wheels move through the first reorientation segment 150. In the present embodiment, the first and second reorientation segments are configured so that three of the four drive wheels 220 disengage the drive surfaces of the track while a single wheel remains engaged with the drive surfaces to drive the vehicle forwardly. In this way, three of the four wheels of the vehicle are released to correct skew or misalignment between one or more wheels on the first side of the vehicle and one or more wheels on the second side of the vehicle while also correcting skew or misalignment of one or more of the leading wheels relative to one or more of the trailing wheels.

After the trailing wheels 220c, 220d pass through the first reorientation segment 150, the vehicle continues forward so that the trailing wheels enter the second reorientation segment 150. In the second reorientation segment both trailing wheels 220c, 220d disengage from the driving surface allowing both wheels to slide or translate relative to the track. When the trailing wheels 220c, 220d disengage from the drive surface of the track, the leading wheels 220a, 220b positively engage the track to drive the vehicle along the track.

The method may also include the step of impeding twisting and/or lateral displacement of the vehicle as the vehicle passes through the reorientation assembly. Specifically, according to one embodiment, the method may include the step of simultaneously applying a force to the side of the vehicle as the vehicle passes through the reorientation assembly. In particular, forces of similar magnitude and opposite direction may be applied to the two sides of the vehicle, urging the vehicle toward the center of the aisle. For instance, as described above, the second reorientation segment 160 may include deflectors 195, a first deflector positioned along the front track 105 and the second deflector positioned along the rear track. The first deflector provides a force against the side of the vehicle in a direction toward the rear track. Similarly, the second deflector 195 provides a force against the opposite side of the vehicle in a direction toward the front track. The forces of the deflectors 195 may be provided by biasing elements so that the deflectors provide generally equal and opposite forces transverse the direction of travel T.

Alternatively, rather than a displaceable element for applying lateral forces to the vehicle, the reorientation assembly may include a fixed guide or stop that limits lateral displacement and/or twisting of the vehicle. Specifically, as noted above, the method may include releasing a plurality of vehicle wheels from engagement with drive surfaces to allow the plurality of wheels to slide relative to the track while one or more wheels remain engaged with a drive surface. The method may include the step of constraining lateral displacement of the vehicle while the plurality of wheels are disengaged from the drive surface. In one embodiment, the method includes the step of releasing three wheels from drive surfaces simultaneously while maintaining a wheel in engagement with a drive surface. While the three wheels are disengaged from the drive surfaces, the method includes the step of engaging one or more of the three released wheels with a stop to impede lateral displacement of the released wheels.

The method may also include the step of re-engaging one or more of the three released wheels with drive surfaces. Additionally, the method may include the step of releasing the one or more wheels from the stop after the step of re-engaging.

In view of the foregoing, the present invention may provide a system in which a plurality of vehicles move along a track to deliver items to a plurality of locations. Optionally, the track may include a loop and the vehicles may circulate around the loop. The track may include a reorientation assembly that reorients the vehicles relative to drive surfaces on the track. The method may include the step of repeatedly engaging and disengaging the drive surfaces of select wheels of the vehicle while repeatedly engaging and disengaging one or more select wheels of the vehicle. The track is configured to allow the wheels to slide relative to the track when the wheels are disengaged from the drive surfaces. In this way, the drive elements on the wheels are displaced relative to the drive surfaces of the track to align the drive elements with the drive surfaces.

In the foregoing description, the reorientation assembly 140, 440 is described as having two separate segments 150, 160 and 450, 460. However, it should be understood that the number of segments in the reorientation assembly may vary. For example, the reorientation assembly 140 may include just a single reorientation segment 150. In such an embodiment, the leading wheels 220a, 220b are reoriented when they pass through reorientation segment 150 and the trailing wheels 220c and 220d will similarly be reoriented when they pass through the reorientation segment. In such an embodiment, the front assembly 152 and rear assembly 154 of the reorientation segment 150 may both include sliding surfaces. Accordingly, when the leading wheels 220 move through the reorientation segment both wheels disengage the drive surfaces of the track while the trailing wheels 220c, 220d remain engaged with the drive surfaces of the track to drive the vehicle forwardly. After moving through the reorientation segment 150, the leading wheels 220a, 220b reengage the drive surfaces of the track to drive the vehicle forward while the trailing wheels 220c, 220d move through the reorientation segment and disengage the drive surfaces of the track.

As described above, the number of reorientation segments and the position of such segments may vary depending on numerous variables, including but not limited to the configuration of the vehicles, the number of wheels on the vehicles, the configuration of the drive surfaces of the track, and the configuration of the drive elements on the vehicles. Accordingly, it should be understood that the reorientation assembly 140, 440 is not limited to the particular number of reorientation segments and/or the configuration of the reorientation segments described above.

Similarly, in the above description the reorientation assembly 140, 440 may include a secondary reorientation element, such as deflectors 195 or fence 485. The secondary reorientation element 195, 485 may form part of the second reorientation segment 160, 460 whereas the first reorientation segment 150, 450 may not include deflectors 195 or guide 485. Accordingly, it should be understood that the number and position of the secondary reorientation element may be varied based on a number of variables. Additionally, it should be understood that the reorientation assembly 140, 440 may be configured without any secondary reorientation elements, such as the deflectors 195 or fence 485.

The methods described herein may be implemented in software, hardware, or a combination thereof, in different embodiments. In addition, the order of methods may be changed, and various elements may be added, reordered, combined, omitted, or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments.

These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A material handling method for delivering items to a plurality of destinations, comprising the steps of:
    loading an item onto a vehicle;
    driving the vehicle with the item to one of the destinations, comprising the steps of:
    driving a first drive element along a first track having a plurality of first engagement elements; and
    driving a second drive element along a second track having a plurality of second engagement elements, wherein the second track is spaced apart from the first track;
    disengaging the first drive element from the first engagement elements while engaging the second engagement element with the second drive elements to allow the first drive elements to slide along the first track; and
    engaging the first drive element with the first engagement elements to drive the vehicle along the first track after the step of disengaging.

2. The method of claim 1 comprising the step of transferring the item from the vehicle into one of the destinations.

3. The method of claim 1 wherein the step of driving comprises driving the vehicle around a loop a plurality of times to deliver a plurality of items and wherein the method comprises the step of disengaging the first drive element each time the vehicle drives around the loop.

4. The method of claim 1 wherein the first and second drive elements comprise rotatable elements and the steps of driving the first and second drive elements comprise the steps of rotating the first and second drive elements.

5. The method of claim 1 wherein the step of loading comprises a step of placing the item on a conveyor and conveying the item on the conveyor toward the vehicle.

6. The method of claim 1 comprising a step of impeding lateral displacement of the first drive element during the step of disengaging the first drive element.

7. The method of claim 6 wherein the step of impeding lateral displacement comprises displacing the first drive element along a guide configured to impede lateral displacement of the first drive element.

8. The method of claim 1 wherein the vehicle comprises a third drive element and a fourth drive element and wherein the step of driving comprises engaging the third drive element with the first engagement elements and engaging the fourth drive element with the second engagement elements.

9. The method of claim 8 comprising the step of disengaging the third drive element from the first engaging elements while one of the first, second or fourth drive elements remains engaged with the first or second engagement elements.

10. The method of claim 9 comprising the step of disengaging the fourth drive element from the second engaging elements while the second drive element engages the second engagement elements.

11. The method of claim 8 wherein the first and third drive elements comprise rotatable gears cooperable with the first engaging elements and the step of disengaging comprises disengaging the rotatable gears from the first engaging elements.

12. The method of claim 11 wherein the second and fourth drive elements comprise rotatable gears cooperable with the second engaging elements and the step of disengaging comprises disengaging the rotatable gears of the second or fourth drive elements from the second engaging elements.

* * * * *